J. P. Manny.
Harvester Rake.
N° 17798  Patented Jul. 14, 1857.
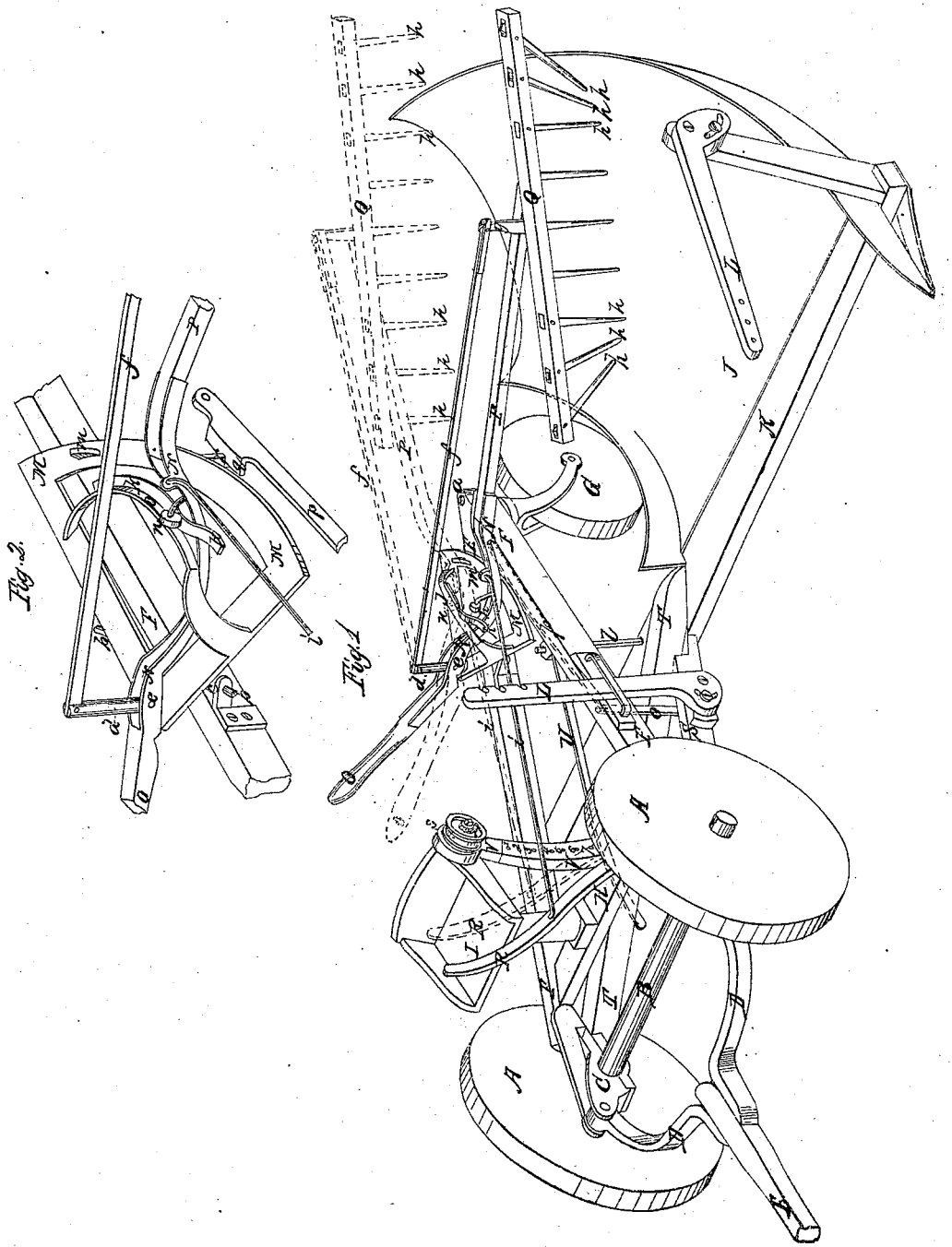

UNITED STATES PATENT OFFICE.

JOHN P. MANNY, OF ROCKFORD, ILLINOIS.

IMPROVED RAKING APPARATUS FOR HARVESTERS.

Specification forming part of Letters Patent No. 17,798, dated July 14, 1857.

*To all whom it may concern:*

Be it known that I, JOHN P. MANNY, of Rockford, in the county of Winnebago and State of Illinois, have invented certain new and useful Improvements in the Raking and Delivering Apparatus of Harvesting-Machines; and I do hereby declare the following to be a full, clear, and exact description of the construction and operation of the same, reference being had to the accompanying drawings, making a part of this specification, in which—

Figure 1 represents a perspective view of a harvesting-machine having the raking and delivering apparatus in question attached to it. Fig. 2 represents an enlarged perspective view of a detached portion of the raking apparatus, to better show and illustrate its action.

Similar letters of reference, where they occur in the separate figures, denote like parts of the apparatus in both.

The nature of this invention relates to the construction and operation of the rake and its manner of contracting and delivering the gavel in a compact form as it is taken from the platform and deposited upon the ground.

To enable others skilled in the art to make and use my invention, I will proceed to describe its construction and operation in connection with the drawings.

A A are a pair of supporting-wheels, arranged on an axle, B, and upon this axle, close up to the wheels, is placed a metallic box, C, (one only being seen in the drawings, but both alike,) in which the said axle turns. To the front parts of these boxes are pivoted the hounds D D, to which the tongue E is connected, and to their rear portions are permanently affixed the frame-pieces F, which unite at a point, $a$, and underneath their junction is placed a caster-wheel, G, which supports the rear ends of these pieces. A transverse piece, H, passes from one of the side pieces F to the other, and upon this transverse piece is placed the conductor's seat I. This frame, supported on the wheels A G, may be termed a "rigid frame," and to it is connected the several parts which raise, lower, and support the platform, to adapt it to such height as may be desired, and which may be termed an "adjustable frame;" but, as this adjustable frame and its actuating parts constitute the subject-matter of another application for Letters Patent, only so much of it will be described herein as is necessary to illustrate the action of the rake and the delivering of the gavel.

J is the platform upon which the cut grain falls. It is flat near the finger-beam K; but as it curves around rearward it becomes contracted in width and concave in form until at its extreme rear end it is of a trough-shaped form, as seen in the drawings, Fig. 1. The object of this is that the grain, as it is swept around by the rake, shall be gradually contracted between the sides of the platform until at the point of delivery it shall be in a gavel and ready for binding, and to prevent anything like hanging the platform assumes its horizontal as well as vertical curvature, with a gradation that presents no injurious obstruction to the passing grain or stalks.

The platform is raised and lowered by a lever which is connected to the rigid frame and extends to the conductor's seat. This will be fully described in the specification which embraces the frame of the machine.

L are the reel-supports.

A quadrant-shaped plate, M, is pivoted to the outer piece, F, of the frame by a shaft, $c$, whose journals $b\ b$ are supported in boxes on said frame-piece, as seen in the enlarged Fig. 2, so that said plate M may be raised or lowered on the frame. The center of this quadrant-shaped plate has a slot in it, so that it may pass in between fixed collars on a stem, $d$, that is supported in a box or bearing attached to the frame-piece F, the stem $d$ turning in said bearing as the rake is swept around over the platform.

A curved or bent shank, N, is pivoted at $e$ to the stem $d$, so that said shank may move with the stem horizontally and also have a vertical movement on its shaft or pivot $e$. To one end of this curved shank N is attached a lever, O, by which the rake may be worked, and to its other end is fastened a bar, P, which extends to and is pivoted at the center of the rake-head Q.

From the top of the stud $d$, to which it is hinged, extends a bar, $f$, the extreme end of which is also hinged to an arm, $g$, fastened to the center of the rake-head. The length of this arm $g$ is about the same as the distance between the pivot $e$ and the top of the stud $d$, to which the bars P f are respectively hinged, so that said bars shall be parallel to each other, and as the rake is connected to these bars it also, as it is raised and lowered, shall do so in parallel planes, and not in the arc of a circle, as it would do if it moved from or on one center alone. The maintenance of this parallel position of the rake as it rises and falls is important, for it will be observed that the rake is attached to a rigid frame, while the platform, with which it acts in concert, is on an adjustable frame, and as the platform must be raised or lowered to adapt it to the condition of the grain to be cut, so must the rake be raised or lowered to adapt itself to the platform; and as the platform is raised into a horizontal plane, so must the rake rise in a horizontal plane to preserve its relative position thereto, and vice versa.

The platform J, as heretofore described, is contracted in width as it curves around and recedes from the finger-bar, and to adapt a rake to the sweeping or clearing of such a platform the rake must of course have a contracting and elongating property, and to give it such a self-acting property, simplicity of construction and an avoidance of machinery to operate it are the main conditions of its value and utility. To effect this object, I pivot the outer teeth, h h h, &c., of the rake to the head Q, so that as the teeth pass around in contact with the gradually-approaching sides of the platform they shall swing in toward the center of the rake, as shown in Fig. 1, and thus conform to the shape of the platform, and gradually bring the stalks into a compact form, until at the end of the platform they are delivered in a gavel on the ground, and when the rake rises to return for the next operation the teeth h, by their own gravity, assume a perpendicular position again and form a rake that will extend clear across the wider portion of the platform, and thus the rake becomes a self contracting and elongating one, to suit the peculiar shape or form of the platform.

To the shank N is connected one end of a rod, i, the other end of which is connected to a lever, R, which is placed in convenient position for the conductor or operator, so that from his seat or stand I he may operate the rake, which is guided in its motions as follows:

On a raised piece, j, secured to the plate M, is a cam-ledge, k, upon which runs a small friction-roll, n, that is attached to the shank N. When the rake is sweeping off the gavel the roll n runs against the under side of the cam-ledge k, which prevents the rake from rising, and when the rake has passed out to the end of the platform and delivered the gavel the shank N runs over a cam-plane, m, on the plate M, which raises up said shank. The friction-roll n, having then arrived at the end of the cam-ledge, is raised with the shank N up onto the top of said ledge, and as the rake returns to sweep off the next gavel the said roll runs on top of the ledge, keeping the rake above the falling grain until it drops perpendicularly on the front of the platform again.

So much of the operation of the rake as involves its mere traversing movement over the platform is simple enough; but the platform has to be raised or lowered to the extent of some twelve or fifteen inches, and it is obvious that the rake must also have a due extent of vertical movement to keep in working position with the platform, and it would not do for the conductor, who must drive his horses, rake off the cut grain, and adjust the cutters both as to their height and for passing any obstruction, to be obliged also to adjust the rake every time he raises or lowers his platform; and to cause the rake to follow automatically the raising and lowering of the platform, I arrange as follows:

S S are pieces hinged to the rear under sides of the boxes C on the main axle B, and their other ends are permanently attached to the finger bar K, and these pieces S are further supported and strengthened with the finger-bar by diagonal braces T T. These several pieces thus put together and hinged to the bearings C constitute what I term the "adjustable frame" of the machine.

A lever, U, connected to the rigid frame F extends into a position convenient for the conductor to operate, and to this lever is suspended the finger-bar and its connecting-frame by a rod, l, so that by means of said lever the finger-bar may be raised or lowered at pleasure.

To the frame-piece S is connected a rod, o, and its upper end is fastened to a lever, p, which has its fulcrum in the rigid frame F. A flange, q, Fig. 2, on this lever takes into a slot cut in a stud, r, arranged on the under side of the plate M, so that every time the lever p is raised the plate M will rise, and when the lever is lowered the plate also lowers, and with the plate also rises and falls the rake with all its operative parts. Now, the piece S, it will be remembered, is a part of the adjustable frame, and the lever p is connected to S, and consequently every time the platform is raised or lowered on its frame the rake is correspondingly raised or lowered on its frame, and thus the two work together in perfect harmony, although one is arranged on a constantly adjusting and adjustable frame, and the other on a rigid or non-adjusting frame. The lever p traverses close to a standard, V, in which are a series of holes, 1, 2, 3, &c., and to which it may be held by a pin at its lowest range, while it can be raised above that line at pleasure to pass intervening obstacles.

The arrangement by which the platform is caused to maintain its parallel position in relation to the ground as it is raised or lowered is, as before stated, the subject-matter of another application for Letters Patent, and need not be further alluded to here, although it constitutes an important element in connection with the rake.

A drum s, is arranged on top of the standard, V, in which a stout spring is coiled, and there is a ratchet-and-pawl attachment between this drum and its axis, the spring being respectively connected to both drum and axis in the well-known manner of clock-springs and drums. Around this drum may pass a cord or chain, its lower end being connected to the lever $p$. The object of this arrangement is that in mowing the finger-bar may drag upon the ground, but not with its whole weight, the excess over and above what is sufficient to keep it in contact with the ground being taken up on the spring-drum, and consequently carried on the frame F of the machine, and thus I have all the advantages of contact between the finger-bar and the ground without the dead dragging weight of it upon the ground, and the finger-bar may thus have a weight upon the ground of ten, twenty, thirty, or any suitable number of pounds within its own limited weight without dragging the whole. This also is the subject-matter of an application for the harvester-frame, though of course it affects more or less other parts of the machine.

Having thus fully described the nature and object of my invention, what I claim therein as new, and desire to secure by Letters Patent, is—

1. In combination with a contracting trough-shaped platform, a self contracting and elongating rake, substantially in the manner and for the purpose described.

2. Raising and lowering a rake, operating as set forth, to cause it to preserve its relative working position with regard to the platform, as said platform is raised or lowered by means substantially such as herein described.

JOHN P. MANNY.

Witnesses:
J. G. MANLOVE,
HOBART H. HATCH.